United States Patent

Hsu et al.

Patent Number: 5,436,805
Date of Patent: Jul. 25, 1995

[54] THERMALLY INSULATED DISTRIBUTED LIGHT NETWORK FROM A CENTRAL LIGHT SOURCE

[75] Inventors: Tsung-Yuan Hsu; Huan-Wun Yen, both of Westlake Village, Calif.

[73] Assignee: Hughes Aircraft Company, Los Angeles, Calif.

[21] Appl. No.: 968,018

[22] Filed: Oct. 29, 1992

[51] Int. Cl.⁶ .................................................. F21V 8/00
[52] U.S. Cl. .................................. 362/32; 362/26; 362/294; 385/901
[58] Field of Search .................. 362/26, 31, 32, 294, 362/328, 329, 330, 373; 385/901, 115, 31

[56] References Cited

U.S. PATENT DOCUMENTS

| | | | |
|---|---|---|---|
| 2,477,957 | 8/1949 | Briskin | 362/294 |
| 3,018,362 | 1/1962 | Joyce | 362/32 |
| 3,767,910 | 10/1973 | Harrigan | 385/901 |
| 3,962,702 | 6/1976 | Kriege | 385/901 |
| 4,459,643 | 7/1984 | Mori | 362/32 |
| 4,528,617 | 7/1985 | Blackington | 362/32 |
| 4,735,495 | 4/1988 | Henkes | |
| 4,743,082 | 5/1988 | Mori | |
| 4,747,648 | 5/1988 | Gilliland, III | 385/901 |
| 4,765,701 | 8/1988 | Cheslak | |
| 4,811,507 | 3/1989 | Blanchet | 40/546 |
| 4,830,899 | 5/1989 | Nakahashi et al. | 362/31 |
| 4,930,049 | 5/1990 | Davenport et al. | 362/32 |
| 4,958,263 | 9/1990 | Davenport et al. | 362/32 |
| 4,989,956 | 2/1991 | Wu et al. | 350/345 |
| 5,036,435 | 7/1991 | Tokuda et al. | 362/31 |
| 5,058,985 | 10/1991 | Davenport et al. | |
| 5,099,399 | 3/1992 | Miller et al. | |

FOREIGN PATENT DOCUMENTS

| | | | |
|---|---|---|---|
| 2013090 | 9/1971 | Germany | 362/32 |
| 2427182 | 12/1975 | Germany | 362/32 |
| 2454996 | 5/1976 | Germany | |
| 3123369A1 | 2/1983 | Germany | |
| 9011321 U | 10/1990 | Germany | |
| 4137670A | 5/1992 | Germany | |
| 0133507 | 7/1984 | Japan | 385/901 |
| 0253903 | 10/1988 | Japan | 385/901 |
| 0010202 | 1/1989 | Japan | 385/901 |

OTHER PUBLICATIONS

Patent Abstracts of Japan, vol. 13, No. 66 (P-828) Feb. 15, 1989 & JP-A-63 253 903 (Mitsubishi) Abstract.
Patent Abstracts of Japan, vol. 7, No. 78 (P-188) Mar. 31, 1983 & JP-A-58 007 604 (Mitsubishi) Abstract.

Primary Examiner—Ira S. Lazarus
Assistant Examiner—Y. Quach
Attorney, Agent, or Firm—Vijayalakshmi D. Duraiswamy; Wanda K. Denson-Low

[57] ABSTRACT

A thermally insulated distributed light network employs an array of discrete, thermally insulative light guides that are spaced slightly away from a central light source and provide optical coupling to optical fibers that have a lower thermal capability. The light guides can either be solid such as quartz, focusing lenses, or a combination of the two. The light receiving ends of the light guides are preferably held by a specially designed coupler so that the guides do not diverge from each other by more than the fibers' optical acceptance angle. The light guides are shaped so that their adjacent edges touch and form an enclosure around the light source, and the fibers are provided in bundles with matching geometries. The network includes an edge-lit display panel that is illuminated by a fiber that has either internal light scattering centers in the form of reflective particles or gas bubbles, or a series of edge notches, to redirect light into the panel.

22 Claims, 3 Drawing Sheets

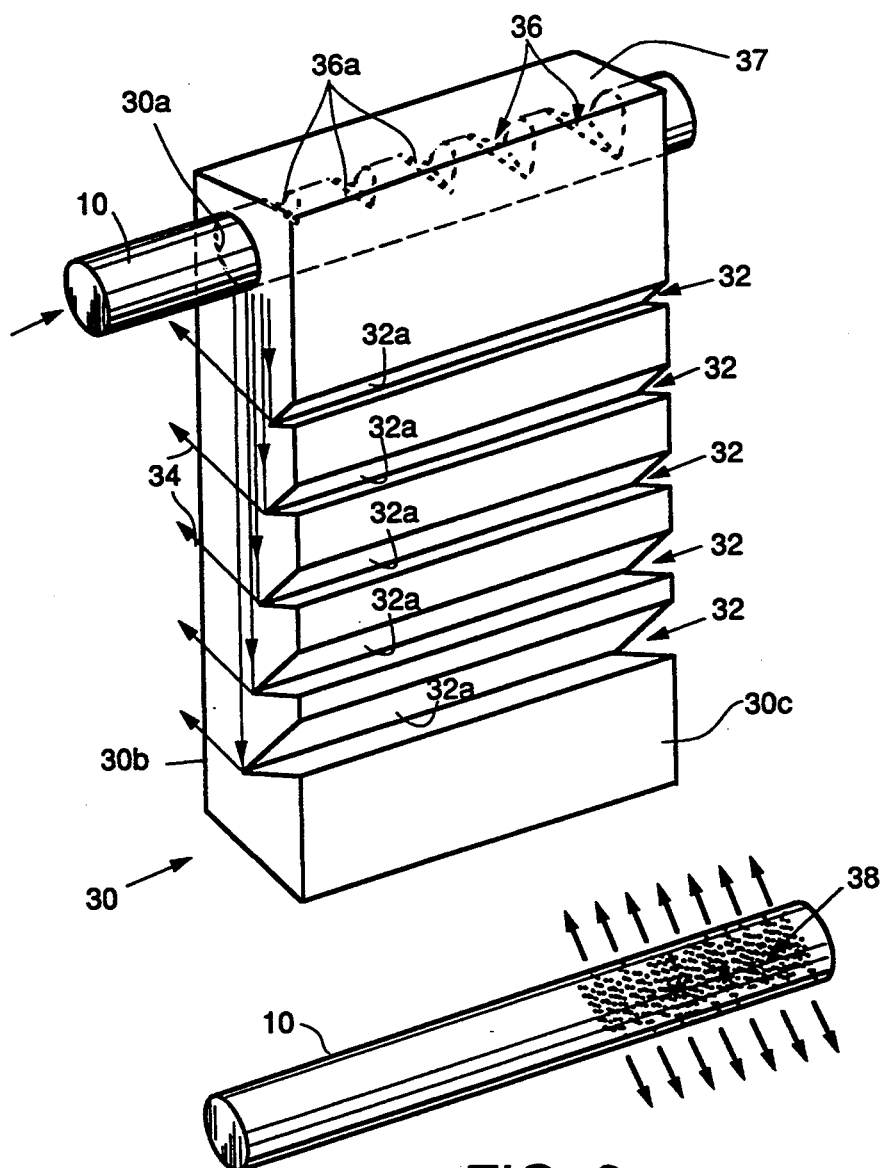
FIG. 7.
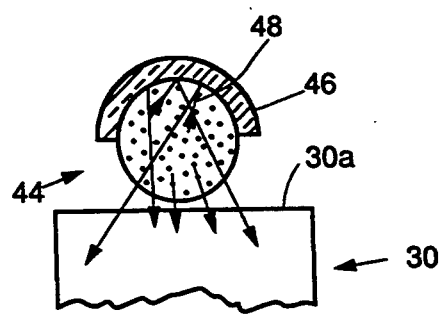
FIG. 8.
FIG. 9.

THERMALLY INSULATED DISTRIBUTED LIGHT NETWORK FROM A CENTRAL LIGHT SOURCE

BACKGROUND OF THE INVENTION

1. Field of the Invention

This invention relates to distributed lighting systems, particularly for vehicles, aircraft, rooms, streets, highways and medical applications, in which optical fibers distribute light from a central source to a number of different optical loads, which can include an edge-lit display panel.

2. Description of the Related Art

Conventional automobile lighting systems use separate light bulbs for each lighting function, resulting in some cases in more than one hundred different light bulbs. This is an undesirable situation in terms of energy efficiency and reliability. Furthermore, some of the bulbs are typically placed in inconvenient locations, making them difficult to access and increasing maintenance costs. The bulbs are powered by an electrical wiring network, leading to the possibility of electrical short circuits that are often difficult to locate. The light bulb systems are also subject to breakage in case of impacts, and add to the weight, bulk and expense of the overall vehicle.

An alternate system, in which light is distributed from a central light source to various optical loads within a vehicle by means of "light busses", its described in U.S. Pat. No. 4,930,049 to Davenport et al. Lighting is provided by this network to the headlight, tail lights and interior lights of the vehicle via optical fibers from a single light source. Details of the light source are given in U.S. Pat. No. 4,958,263 to Davenport et al. It consists of a pressurized lamp with quartz light guides that are merged into portions of its outer surface to provide illumination for the various optical loads within the vehicle. The portions of the lamp that are not merged with the light guides are coated with a diffusive reflective coating that is said to substantially prevent light from being transmitted through the coating, thereby directing all of the light generated by the lamp into the light guides.

While the system described in these patents resolves many of the problems discussed above in connection with multi-bulb systems, it still has some undesirable limitations. To substitute one light source for another, either to replace a lamp that has burned out or to substitute a lamp with a different power rating, it is necessary to remove the light guides along with the lamp, and then to individually couple each of the light guides for the new lamp into the system. Since the light guides are merged directly into the lamp body, there is a direct thermal connection between the two that both adds to the heating of the light guides, and disturbs the temperature distribution of the lamp. The latter effect can impair the quality of light delivered by the system, since the lamp's spectral output is highly sensitive to temperature. An additional energy input would also be required to compensate for heat losses through the light guides, since metal halide lamps of the type employed in the cited patents require a minimum temperature of approximately 800°–900° C. to maintain the metal halide in its vapor phase; and no mechanism is provided for dissipating heat that has been radiated out from the lamp. Furthermore, the numerical aperture (N.A.) of the output light is much larger than the N.A. of the convention optical fibers. The coupling efficiency could therefore be substantially lower than if the beam profile between the quartz rods and the optical fibers were matched.

An automobile's lighting system will typically include one or more display panels that can function as brake lights, tail lights, dome lights and the like. One such display device is disclosed in U.S. Pat. No. 4,989,956 to Wu et al., assigned to Hughes Aircraft Company, the assignee of the present invention. In this device a fluorescent dye-doped panel is side-lit by ambient light, or by a fluorescent light source with a semi-cylindrical reflector that directs light from the source onto the panel. The panel responds by emitting light of a longer wavelength out through one edge, where it is coupled into the edge of a display panel. Light is re-emitted out from the side of the display panel by means of a distortion on its side surface which redirects light through total internal reflection. In another display device, described in application Ser. No. 07/725,216, filed Jun. 26, 1991 by Wu et al., and also assigned to Hughes Aircraft Company, a display panel is directly edge-lit by an elongated tungsten-halogen lamp whose emission is focused onto the panel edge by an elliptical reflector. Grooves that are cut into one side surface of the panel redirect the light traveling through the panel out of the opposite surface by total internal reflection; the depths of the grooves are graded to provide an even distribution of light reflected out of the panel, thereby compensating for the progressive loss of light within the panel away from its light receiving edge.

Another form of edge-lit display panel, described in U.S. Pat. No. 4,811,507 to Blanchet, employs elongated lamps at the opposite edges of the panel. Light from the edges is redirected out of the panel either by means of striations whose depths and frequency increase in a direction away from the light sources, or by "light re-emitting elements" in the form of inserts such as microballs or micro-bubbles. The inserts are distributed within the panel so that their density increases in a direction away from the light sources, and their light re-emitting power also increases in that direction. This characteristic is said to make it possible to obtain a uniform distribution of light from the panel's front surface.

Another display panel, disclosed in U.S. Pat. No. 5,036,435 to Tokuda et al., employs a sheet of multiple side-by-side optical fibers as the panel. The fibers are illuminated at one end by a discrete light source, and at their opposite ends include "flaws" in the form of notches that are cut into one side of the fiber sheet, causing light to "leak" out of the sheet. The width, density and depth of the "flaws" are preferably increased in direct portion to their distance from the light-receiving ends of the fibers to obtain a uniformity in the brightness of the emitted light.

The first three display panels described above use discrete light sources, and are thus not compatible with a system that relies upon light distribution to numerous different optical loads from a central source. While the light source in the '435 patent is located a distance away from the panel itself and is connected to the panel by means of optical fibers, the fibers also form the display panel itself. This requires multiple fibers running between the panel and the light source, and calls for replacement of both the display and the optical supply portions of the fibers if there is a need to replace either one.

SUMMARY OF THE INVENTION

The present invention seeks to provide a distributed lighting network that is thermally insulated from a central light source, allows the light source to be easily changed without disturbing the light distribution network, does not interfere with the temperature or spectral characteristics of the light source, provides a heat sink for thermal energy radiated out from the light source, and matches the output profile of quartz guides to the N.A. of optical fibers. It also seeks to provide an edge-lit display panel that is compatible with a distributed light network and a remote light source, and which allows easy replacement of either the display panel or its optical feed. It is particularly applicable to lighting systems for vehicles, aircraft, rooms, streets, highways and medical equipment.

These goals are achieved with an optical distribution network in which an array of discrete, thermally insulative light guides are positioned to receive and transmit light from a central light source. A plurality of optical fibers that have a lower thermal capability than the light guides are positioned to receive light from respective light guides, with the fibers thermally separated from the light source by the light guides. The light receiving ends of the light guides are spaced away from the light source, preferably about 0.2–1 mm to preserve the light intensity yet avoid direct contact with the lamp envelope, and are held in a mechanical coupler that also serves as a heat sink for heat radiated from the light source.

In one embodiment the light guides are formed from a solid, transparent, thermally insulative material such as quartz, and substantially enclose the central light source with their edges in close proximity to each other. In another embodiment the light guides comprise lenses that direct light from the central source through air gaps onto respective optical fibers, either directly or through intervening solid light guiding elements.

When the optical fibers have optical acceptance angles that are less than the light source's output dispersion angle, the light guides are preferably arranged along a pair of cones whose apexes meet at the light source, and whose surfaces diverge away from each other at an angle that is not substantially greater than the fiber acceptance angle. The light guides in this version are again shaped to form full enclosures around the light source. To couple the polygon shaped light guides with circular cross-section optical fibers, the fibers are preferably arranged in bundles that substantially match the cross-sectional shapes of the light guides, with smaller diameter fibers dispersed in the spaces between a larger set of fibers.

An edge-lit display panel is illuminated by one of the fibers, which is positioned adjacent the panel's light-receiving edge and redirects light from the central source into the panel. The light is redirected out of the fiber either by means of notches that extend into the opposite side of the fiber from the panel and reflect light out through total internal reflection, or by an array of light scattering centers that are dispersed internally within the fiber and have a refractive index that is substantially different from that of the fiber. The light scattering centers can consist of either reflective particles or gas bubbles. The notches or light scattering centers are preferably graded in size and/or density to increase the uniformity of the light output from the panel. For a fiber with light scattering centers, a reflector can be used to redirect light from the fiber into the edge-lit panel.

These and other features and advantages of the invention will be apparent to those skilled in the art from the following detailed description, taken together with the accompanying drawings.

BRIEF DESCRIPTION OF THE DRAWINGS

FIG. 7 is a perspective view of an edge-lit display panel that is illuminated by one of the optical fibers from the distributed light network;

FIG. 8 is a perspective view of an alternate illuminating fiber for the edge-lit display panel of FIG. 7; and FIG. 9 is a fragmentary sectional view of an edge-lit display panel illuminated by the fiber of FIG. 8, with a reflective coating added to the fiber.

DETAILED DESCRIPTION OF THE INVENTION

Figure 1:
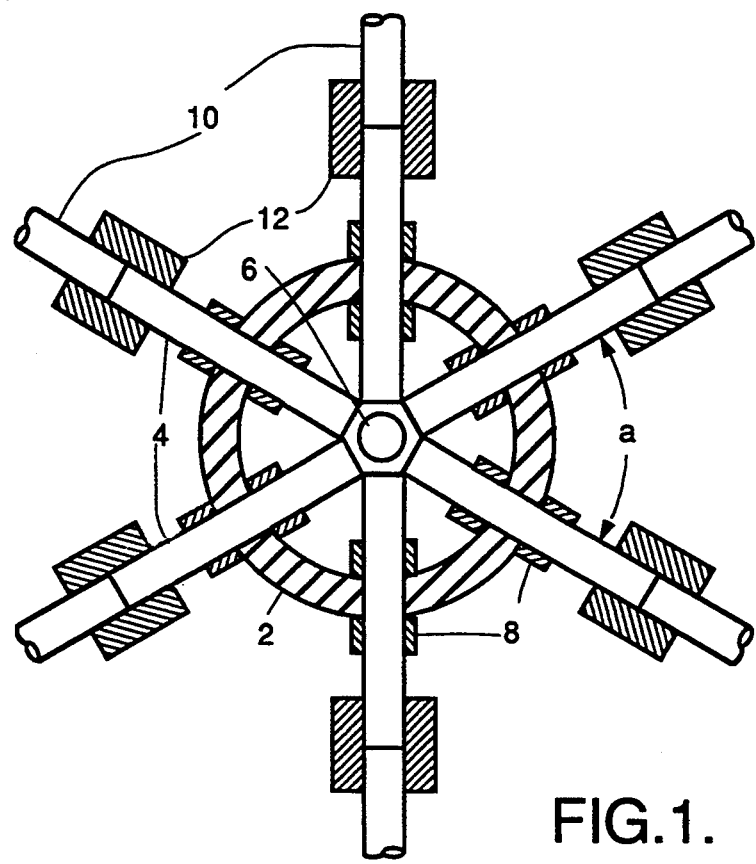
FIG. 1 is a sectional view looking down at one embodiment of a distributed light network in accordance with the invention.

One embodiment of a thermally insulated distributed light network that significantly improves upon prior systems is shown in FIG. 1. The system includes a mechanical coupler 2 that holds an array of optical light guides 4 in desired positions with respect to a central light source 6, which is preferably a high intensity discharge (HID) metal halide lamp. The coupler is constructed from metal, ceramic or other material that can withstand the high lamp temperature, and preferably has a high thermal emissivity. It is machined or molded preferably to a generally cylindrical, open-ended configuration as illustrated in FIG. 1. A number of radially-directed sleeves 8 are formed integrally with the coupler and serve to hold the light guides 4 in place, preferably by means of set screws (not shown) which extend through the sleeves. The sleeves have inner openings which match the shapes of the light guides, which may be rectangular, circular, or other desired shapes.

Each of the light guides 4 is coupled at its outer end to respective optical fibers 10. The fibers are preferably formed from low cost and light weight plastic, and can be of conventional design. Such fibers cannot withstand the high temperatures (typically 800°–900° C.) at the surface of an HID metal halide lamp, but are thermally spaced and protected from the lamp by the intervening light guides 4. A preferred mechanism for coupling the light guides and fibers together is a simple collar 12 that admits the light guides and fibers at its opposite ends and holds them in place by respective set screws (not shown), with the light guides and fibers either butting directly against each other or lodged within respective sockets that open to each other within the collars. A refractive index matching fluid may be applied to reduce the coupling loss between the quartz rods and the optical fibers.

Quartz is a preferred material for the light guides, due to its excellent optical transmission properties and high thermal insulation; quartz light guides should be polished at both ends. The lengths of the quartz light guides are selected so that the temperature at their output ends is within the operating temperature range of the low cost optical fibers. The light guides are preferably positioned by the coupler 2 so that their ends which face the lamp 6 touch each other along their edges; the light guides thereby surround the lamp in a complete enclosure that eliminates optical losses from between the light guides. For this purpose the light guides, which in the embodiment of FIG. 1 lie in a common plane that is perpendicular to the central axis of the coupler 2, are rectangular in shape.

The cross-sectional dimensions are selected so that, with their edges touching each other as shown in FIG. 1, the light guides are spaced slightly away from the lamp 6, preferably by about 0.2–1 mm. This protects the light guides from any conductive heat transfer from the lamp, keeps them from disturbing the lamp's temperature characteristics and thereby altering its optical emission spectrum, and at the same time preserves the light intensity across the gap between the lamp and light guides. In addition to the thermal insulation provided by the light guides between the optical fibers and the lamp, the thermally conductive coupler 2 serves as a heat sink that dissipates radiant heat energy from the lamp.

Plastic optical fibers typically have an optical acceptance angle (numerical aperture) of about 60°, meaning they will transmit light that is received within a cone that extends 30° from the fiber axis, but reject light outside of the acceptance cone. Quartz, on the other hand, has an acceptance angle approaching 180°. To enhance the system's optical efficiency, the light guides 4 preferably extend radially away from the lamp with an angle "a", equal to the fiber's acceptance angle, between them. The maximum angle to the light guide axes at which light from the lamp can enter the light guides is thus limited to about 30°, and this maximum offset angle is preserved as the light propagates through the light guide by total internal reflections. Accordingly, the light from the light guides that reaches their respective optical fibers is restricted to the fiber acceptance angle. A 60° acceptance angle is accommodated with the six-leg coupler shown in FIG. 1.

The lamp 6 is held within the coupler by any convenient means, such as a pair of ceramic disks at each end of the lamp, that allow it to be easily replaced without disturbing other parts of the system. Similarly, any of the light pipes can be easily removed by loosening the set screws in the coupler sleeves 8 and in the collars 12, and a fiber can be taken off by simply removing its collar set screw. If desired, the quartz light pipes 4 can be bent outside the coupler so that they are parallel to the coupler axis, thus reducing the system's overall packing size. With 3.5 mm×7 mm or 3.5 mm×14 mm rectangular quartz light guides, the bending loss has been found to be insignificant with a radius of curvature of about 25 mm or more.

Figure 2:
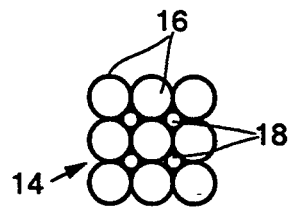
FIG. 2 is an end view of a fiber optic bundle used in the system of FIG. 1.

Optical fibers are conventionally fabricated with smaller diameters, typically about 1 mm, than may be desired for the light guides. In this event the fibers are preferably provided in a bundle with an overall geometry that generally matches the cross-sectional shape of the light guide. Such a fiber bundle, designed for a square 3 mm×3 mm light guide, is illustrated in FIG. 2. The bundle 14 consists of a square matrix of individual 1 mm diameter fibers 16. To reduce light losses, smaller diameter optical fibers 18 are preferably interspersed in the spaces between the 1 mm fibers 16. As an alternate to bundles of circular optical fibers, a single 3 mm×3 mm square optical fiber could be used, although it might have to be specially fabricated. Square fibers require the use of a square nozzle when drawing out the fiber material, and a control over the temperature of the process so that the fiber material is sufficiently viscous when drawn.

An HID lamp emits light over an arc on the order of 120°. To reduce light losses when this type of lamp is used in connection with plastic fibers having an acceptance angle of about 60°, an arrangement like that shown in FIG. 3 may be employed. A modified coupler 2a includes mounting sleeves for twelve light guides, rather than the six light guides used in the embodiment of FIG. 1. Six of the light guides 4a are carried in sleeves 8a that extend in a radial direction from the lamp 6 and are directed up by about 30°, while the other six light guides 4b are mounted in sleeves 8b that are also radially directed but are tilted down by about 30°. The upper light guides 4a thus lie along the surface of a cone, indicated by phantom lines 20a, that extends upward from an apex at the lamp, while the other light guides 4b are located along the surface of another cone 20b that extends downward from an apex at the lamp. The cones surfaces diverge away from each other at an angle that is not substantially greater than the acceptance angle "a" associated with the optical fibers. Thus, with a 60° angle between the cones, the fibers 10a that are illuminated by light guides 4a accept light that is emitted from the lamp along an arc from horizontal to 60° above horizontal, while the fibers 10b that are illuminated by the downward directed light guides 4b accept light that is emitted from the lamp along an arc from horizontal to 60° below horizontal. The fibers thereby collectively accept substantially the full lamp output, from 60° above horizontal to 60° below.

Figure 3:
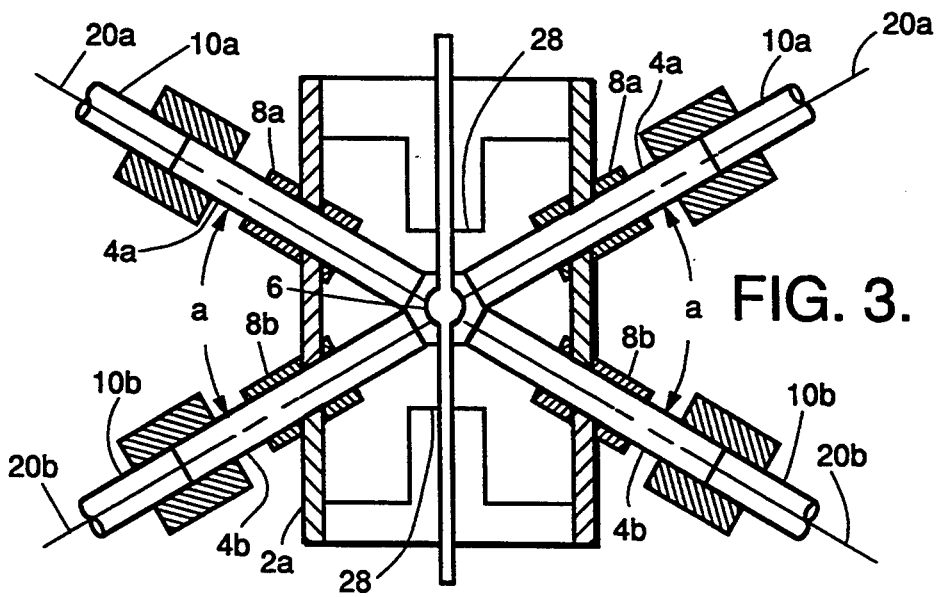
FIG. 3 is a sectional view in elevation of another embodiment of the invention in which light is guided out from a central source along the surfaces of divergent cones.

In FIG. 3 a mechanism for holding the lamp 6 in place is shown in simplified form, consisting of a pair of ceramic or other heat resistant disks 28 on opposite sides of the lamp, with openings for the lamp wirings. The disks can either be rotated away or removed to allow easy replacement of the lamp.

Figure 4A:
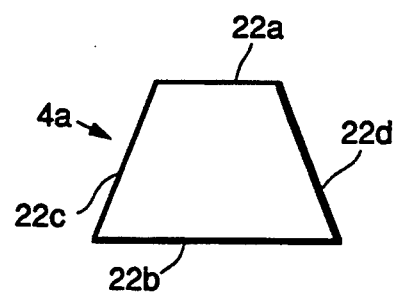
FIGS. 4a and 4b are respectively end views of a light guide and a fiber optic bundle used in the system of FIG. 3.

Since the light guides 4a and 4b are offset from horizontal, gaps will be left between their lateral edges if they retain the rectangular cross-section of the light guides in FIG. 1, and light will be lost through these gaps. This is handled by providing the light guides 4a with a trapezoid shape, as shown in FIG. 4a. The upper trapezoid edge 22a is parallel to, but shorter than, the lower trapezoid edge 22b, while the trapezoid's side edges 22c and 22d are offset from vertical by equal but opposite angles. The difference in length between the upper and lower edges 22a and 22b is selected so that the side edges 22c and 22d of each light guide touch the side edges of the adjacent light guides when the light guide is directed upwards at 30°. The downward directed light guides 4b have a complementary trapezoidal shape, but with their upper edges longer than their lower edges so that the side edges of adjacent light guides touch each other when the light guides are tilted downward by 30°. The adjacent edges 22b of the upper and lower light guides are also positioned to touch each other, thus allowing substantially all of the light emitted from the lamp to be captured by the optical distribution system.

Figure 4B:
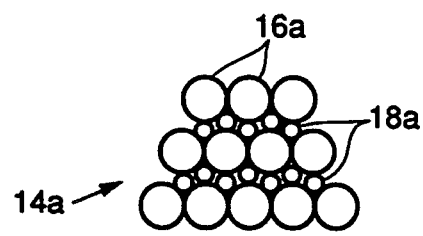

A fiber bundle 14a that is preferably coupled with the trapezoidal light guide 4a is shown in FIG. 4b. It consists of an array of larger diameter fibers 16a, typically about 1 mm in diameter, that are arranged in a trapezoidal array which matches the cross-sectional shape of the light guide 4a. As in the embodiment of FIG. 2, smaller diameter fibers 18a are preferably interspersed in the gaps between the larger fibers 16a to reduce optical losses.

Figure 5:
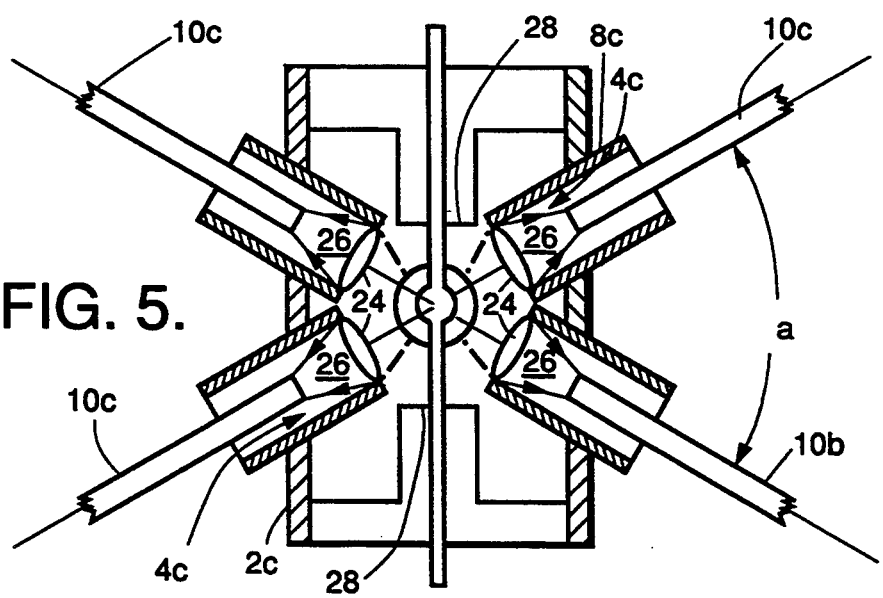
FIG. 5 is a sectional view in elevation showing the distribution network with an alternate light guide mechanism to that shown in FIG. 3.

If it is desired to increase the optical intensity within the fibers, an arrangement such as that shown in FIG. 5 can be used. In this embodiment a mechanical coupler 2c is used that has both upward and downward directed light guide sleeves 8c, similar to the mechanical coupler shown in FIG. 3. However, the thermally insulating light guides in this case consist of lenses 24 that are positioned towards the lamp end of the sleeves 8c, and focus light from the lamp 6 through air gaps 26 into the fibers 10c, which are held at the rear of the sleeves. The optical intensity within the fibers increases in accordance with the ratio between the lens and fiber cross-sectional areas.

Figure 6:
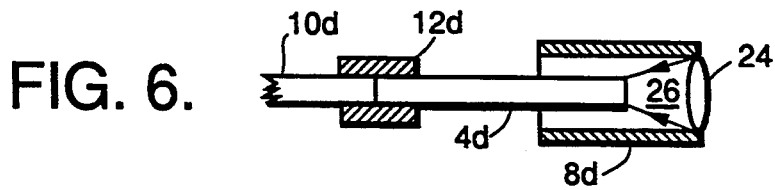
FIG. 6 is a sectional view of a variation of the light guide shown FIG. 5.

An alternate light guide embodiment is shown in FIG. 6 that retains the high intensity fiber illumination of FIG. 5, but provides additional thermal insulation from the lamp. A mechanical coupling piece similar to coupler 2c is used, although only one of the light guide sleeves 8d is shown for simplicity. The lens 24 focuses light from the lamp onto a smaller diameter quartz light guide 4d, which extends out the rear of the sleeve and is coupled to a small diameter fiber (or fiber bundle) 10d by means of a coupling collar 12d. The fiber is protected from conductive heat transfers from the lamp by both the air gap 26 and the light guide 4d, and from radiant heat transfers by the light guide.

The invention also contemplates a novel display panel illumination in which a display panel, such as a rear windshield brake light, is edge-lit by one of the fibers 10 that is illuminated from the central light source 6. One embodiment of such a system is shown in FIG. 7. An optical display panel 30 has an opening 30a towards one end that receives the optical fiber 10, a front surface 30b (only the edge of surface 30b can be seen in the figure) through which the display light is emitted from the panel, and a rear surface 30c. A series of grooves 32 are cut or molded into the rear panel surface generally parallel to the fiber 10, with successive grooves extending progressively deeper into the panel to provide a light output with an approximately uniform intensity. The groove surfaces 32a that face the fiber 10 are angled so that light traveling through the panel from the fiber is redirected at groove surfaces 32a by total internal reflection to exit the panel at its front surface 30b, as indicated by light rays 34. This type of display panel is described in application Ser. No. 07/725,216, referenced above. The preferred embodiment incorporates a series of curvatures in each groove to disperse the output light, but the present invention is also applicable to display panels without such curvatures.

The optical fiber 10 is provided with a series of notches 36 which can be cut or molded to extend into the opposite side of the fiber from the display panel's grooves 32. The surface 36a of each groove that faces in the direction of the light coming from the central lamp is formed at an angle to the fiber axis, preferably 45°, to redirect light traveling through the fiber into the display panel by total internal reflection. Since a portion of the fiber light is reflected out of the fiber at each notch, leaving a reduced amount of light to continue onto the remaining notches, the notch depths are graded progressively deeper in the direction of light transmission through the fiber to approximately compensate for the light reflected out at each notch, and thereby provide a reflection of approximately equal amounts of light from each notch. The notches are in-line with each other, and thereby reflect light out of the fiber and into the display panel in a general uniform pattern. A thin, highly reflective metallic coating 37 is formed over the end of the panel, on the other side of the fiber 10 from grooves 32, to reflect any escaping light back into the panel.

A variation on this arrangement would be to bring the fiber 10 up to the edge of, but not into, the panel 30. The notches 36 could then be formed directly into the upper end of the panel, rather than into the fiber, to reflect light emitted from the end of the fiber.

Another technique for tapping light out of the fiber, illustrated in FIG. 8 involves the creation of an array of light scattering centers 38 that are dispersed internally within the fiber 10. A display panel (not shown) would be positioned with its light-receiving edge adjacent the fiber, as in FIG. 7. The light scattering centers have refractive indices that are substantially different from that of the fiber, so as so scatter light transmitted through the fiber. The internal light scattering centers can consist of either reflective particles, or of gas bubbles formed within the fiber. The centers are preferably distributed with a gradient in their size and/or density to compensate for the progressive loss of light from the fiber, and yield an approximately uniform amount of light scattering along the fiber length.

When reflective particles such as metal particles (which should have a higher melting point than the plastic fiber material) are used, they can be mixed in with the molten fiber plastic before the fiber is drawn. To produce a density gradient, a small amount of particles could initially be introduced to the plastic, with additional particles continuously added as the fiber drawing progresses. The sizes of the particles added to the molten bath could also be adjusted as the fiber is drawn to produce a size gradient. The particles should be larger than the wavelength of the light transmitted through the fiber for good scattering, and will generally range in size from a few microns to a few tens of microns.

To form gas bubbles as the light scattering centers, a pressurized gas could be applied to the molten fiber plastic bath before the fiber is drawn. To obtain a gradient in the bubbles, the gas jet can be applied to the plastic as the fiber is being withdrawn and the jet adjusted over time, or fiber sections with different bubble densities and/or sizes could be spliced together.

The majority of the fiber 10 will lie between the central lamp and the display panel and will not intentionally have any light scattering centers; only the end of the fiber at the display panel will have a deliberate light scattering mechanism. This is most conveniently accomplished by simply forming the main portion of the fiber and the light scattering portion separately, and splicing the two together.

Since much of the light reflected out of the fiber from the light scattering centers will travel away from the display panel and hence be lost if uncorrected, a reflector is preferably provided to redirect these light rays into the panel. Although a separate reflector could be used, a simpler approach would be/to coat the portion of the fiber opposite to the display panel with a reflective coating, as illustrated in FIG. 9. In this situation the optical fiber 44 is shown adjacent the light-receiving edge 30a of the display panel 30, with light rays directed out from the fiber both towards and away from the panel. A coating 46 of a reflective material such as metal is formed around approximately half the circumference of the fiber, on the opposite side of the fiber from the panel. As illustrated, light rays 48 that are initially scattered in a direction away from the panel are reflected by coating 46 and travel back through the fiber towards the panel.

Experiments were conducted with quartz light guides having three different cross-sectional shapes, and a central HID lamp having a total radiant power output of 30 watts and an effective output of about 14.5 watts. The outputs from five circular quartz guides with 6 mm diameters were compared with the outputs from six quartz guides with rectangular cross-sections of 3.5 mm×7 mm and 3.5 mm×14 mm, respectively. The output powers measured for the three configurations were 8.8 W, 11.6 W and 13.1 W, while the power intensities were respectively 6.2, 7.9 and 4.4 W/cm$^2$; their respective efficiencies were 60%, 80% and 90%. The equilibrium temperatures of the metal couplers used to hold the light guides was measured to be about 55° C., which is well below the HID lamp envelope temperature of about 900° C. and the plastic fiber maximum operating temperature of about 110° C. A temperature slightly above room temperature was measured at the output ends of the 4 cm long quartz guides; this implied that shorter quartz guides could be used without compromising the system's performance.

A novel distributed lighting network that provides good mode matching and thermal insulation between a central light source and the distribution fibers, that does not disturb the temperature of the light source and allows it to be easily replaced, and that provides heat sinking for the light source and also an improved edge-lit display, can thus be achieved with the invention. The distributed lighting system is suitable for many applications, including vehicles, aircraft, rooms, streets, highways and medical equipment. While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A thermally insulated distributed light network, comprising:
   means for holding a thermally radiative light source,
   a plurality of discrete, thermally insulative light guides each having a predetermined optical acceptance angle, light receiving and light transmitting ends, and a longitudinal axis between its ends, said light receiving end receiving light from said light source,
   a plurality of optical fibers each having a lower thermal capability and a smaller optical acceptance angle than a corresponding one of said light guides,
   means for supporting and positioning said light guides to substantially surround a light source held by said light source holding means with the light receiving end of each light guide in close proximity to the light receiving ends of adjacent light guides, and the light guides extending away from the held light source with the longitudinal axes of adjacent light guides extending away from each other by approximately the optical fiber acceptance angle, and
   means for supporting and positioning said optical fibers to receive light transmitted by respective transmitting ends of said light guides, said optical fibers being thermally separated from said held light source by their respective light guides.

2. The distributed light network of claim 1, wherein said light guides have light receiving ends that are spaced away from a light source held by said light source holding means.

3. The distributed light network of claim 2, wherein each of said light guides is formed from a solid, transparent, thermally insulative material.

4. The distributed light network of claim 3, said light guides comprising quartz.

5. The distributed light network of claim 2, said optical fibers each having a common optical acceptance angle that is less than the optical acceptance angle of its respective light guide, wherein said light guides are arranged generally along a pair of cones, each of said cones having an apex that meets the apex of the other cone at a light source held by said light source holding means, said cones having surfaces that diverge away from each other at an angle that is not substantially greater than said common fiber acceptance angle.

6. The distributed light network of claim 5, wherein the light receiving end of each of the light guides in each cone substantially meets the light receiving end of an adjacent light guide in the other cone.

7. The distributed light network of claim 5, wherein the light guides in each cone each have a light receiving end with a trapezoidal cross-section that is bounded by parallel upper and lower edges of unequal lengths and a pair of equal length lateral edges.

8. The distributed light network of claim 2, said light guides each including a solid transparent member with a polygon cross-section that is coupled to a respective plurality of optical fibers, the fibers for each solid member being arranged in a bundle that substantially matches the cross-sectional shape of said solid member.

9. The distributed light network of claim 8, wherein the fiber bundle for each solid member comprises a first array of adjacent circular cross-section fibers, and a second array of circular cross-section fibers, the fibers of said second array having diameters that are smaller than the diameters of the fibers in the first array, and being located in spaces between the fibers of the first array.

10. The distributed light network of claim 2, wherein said light guides have light receiving ends that are positioned about 0.2-1 mm from a high intensity discharge lamp held by said light source holding means.

11. The distributed light network of claim 2, further comprising a display panel that includes an input edge that is positioned adjacent one of said optical fibers to receive light from said one optical fiber, an output surface, and means for redirecting light received from said input edge out through said output surface, said one optical fiber including means for redirecting light traveling through said one fiber into the panel through said input edge.

12. The distributed light network of claim 11, said fiber having a longitudinal axis and including a plurality of open notches that extend into said fiber towards the means for redirecting light of said display panel, said notches being angled relative to said fiber axis to reflect light transmitted through the fiber away from the notches and into the panel by total internal reflection at the notches.

13. The distributed light network of claim 1, wherein said light guides are positioned to form an enclosure around a held light source.

14. The distributed light network of claim 1, said light guide supporting and positioning means forming an enclosure around a light source held by said source holding means, said enclosure comprising a thermally conductive material that dissipates heat radiated from said light source.

15. The distributed light network of claim 14, wherein said enclosure has a generally cylindrical shape.

16. The distributed light network of claim 15, wherein said enclosure is open at the ends of its generally cylindrical shape.

17. The distributed light network of claim 14, said light guide supporting and positioning means including an array of light guide mounting sleeves that extend through said enclosure to hold respective light guides with a generally radial orientation with respect to a light source held by said light source holding means.

18. The distributed light network of claim 17, wherein said light guide mounting sleeves have central axes that are arranged along a pair of conical projections, said conical projections having respective apexes that meet at a light source held by said light source holding means, and respective projection surfaces that diverge away from each other.

19. The distributed light network of claim 1, wherein said means for supporting and positioning said light guides holds said light guides with their light receiving ends spaced approximately 0.2-1 mm from a light source held by said light source holding means.

20. An edge-lit display panel with a fiber optic illumination source, comprising:
   a display panel that includes a light receiving portion, an output surface, and means for redirecting light received from said light receiving portion out through said output surface,
   an optical fiber having a longitudinal axis and positioned adjacent the light receiving portion of said panel, and
   a plurality of open notches that extend into said fiber towards the means for redirecting light of said display panel, said notches being angled relative to said fiber axis to reflect light transmitted through the fiber away from the notches and into the panel by total internal reflection at the notches.

21. The illumination source of claim 20, wherein the depth of said notches are selected to provide an approximately uniform illumination of said panel.

22. The illumination source of claim 21, wherein the depths of said notches are graded progressively deeper in the direction of light transmission through the fiber, the gradient in notch depth being selected to approximately compensate for the light reflected out from the fiber at each notch, and to thereby provide a reflection of approximately equal amounts of light from each notch.

* * * * *